United States Patent
Handa (10) Patent No.: US 8,256,449 B2
(45) Date of Patent: Sep. 4, 2012

(54) SELECTIVE WARMING AND HEAT ISOLATION FOR ON BOARD HIGH PRESSURE STORAGE TANKS INSTALLED ON GAS FUELED VEHICLES

(75) Inventor: Kiyoshi Handa, Takanezawa-cho (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 11/935,637

(22) Filed: Nov. 6, 2007

(65) Prior Publication Data

US 2009/0114367 A1    May 7, 2009

(51) Int. Cl.
*F16K 49/00*    (2006.01)

(52) U.S. Cl. .............................. 137/338; 60/320; 141/82

(58) Field of Classification Search .................. 137/338; 62/45.1, 53.2; 141/82, 231; 60/320; 165/52
See application file for complete search history.

(56) References Cited

U.S. PATENT DOCUMENTS

| | | | |
|---|---|---|---|
| 6,321,779 B1 * | 11/2001 | Miller et al. .................. | 137/340 |
| 6,436,562 B1 | 8/2002 | DuBose | |
| 6,548,199 B1 | 4/2003 | Tanaka | |
| 6,675,573 B2 | 1/2004 | Kempfer | |
| 6,692,852 B2 | 2/2004 | Yang | |
| 6,865,901 B2 | 3/2005 | Horn | |
| 7,124,790 B2 * | 10/2006 | Bushko .......................... | 141/82 |
| 2002/0027027 A1 | 3/2002 | Skala | |
| 2002/0073618 A1 * | 6/2002 | Ovshinsky et al. ............... | 48/61 |
| 2002/0098396 A1 | 7/2002 | Kobayashi | |
| 2002/0168556 A1 | 11/2002 | Leboe | |
| 2003/0235734 A1 | 12/2003 | Halltiner, Jr. | |
| 2004/0055798 A1 | 3/2004 | Almkermann | |
| 2004/0058215 A1 | 3/2004 | Bruck | |
| 2004/0081872 A1 | 4/2004 | Herman | |
| 2004/0137295 A1 | 7/2004 | Houlberg | |
| 2004/0151959 A1 | 8/2004 | Formanski | |
| 2004/0209135 A1 | 10/2004 | Wexel | |
| 2005/0095477 A1 | 5/2005 | Perry | |
| 2005/0103479 A1 | 5/2005 | Richardson | |
| 2005/0175870 A1 | 8/2005 | Hagan | |
| 2005/0191534 A1 | 9/2005 | Kim | |
| 2006/0219298 A1 * | 10/2006 | Suzuki .......................... | 137/338 |

FOREIGN PATENT DOCUMENTS

| | | |
|---|---|---|
| DE | 10242804 | 4/2004 |
| FR | 2780102 | 12/1999 |

* cited by examiner

Primary Examiner — Craig Schneider
Assistant Examiner — Craig J Price
(74) Attorney, Agent, or Firm — Porter Wright Morris & Arthur; Mark Duell (57) ABSTRACT

A thermal management system for gas flow from an on board high pressure vehicle gas storage tank comprising an on board heat source operatively interconnected with a heater disposed in proximity to the metal component gas outlet flow control system of the on board tank; a thermostat regulating the flow of heat to the heater such that the thermostat regulates the temperature of the metal component outlet flow control system of the tank to a temperature corresponding to at least the minimum lower limit temperature permitted by the temperature tolerance range of metal component outlet flow control system of the tank; and an optional insulating shroud circumferentially disposed surrounding the gas flow heater installed in the system.

2 Claims, 13 Drawing Sheets

SELECTIVE WARMING AND HEAT ISOLATION FOR ON BOARD HIGH PRESSURE STORAGE TANKS INSTALLED ON GAS FUELED VEHICLES

FIELD OF THE INVENTION

The present invention relates to a selective warming thermal management system for enhancing the performance of high pressure storage tanks for hydrogen and CNG gas fuel, or other industrial gas, by compensating for thermal and mechanical stresses caused during the depletion of gas from the tanks and by the environmental exposure of the tanks to a low temperature ambient environment. The in situ techniques I have developed and describe in the related applications mentioned above manage the thermal effects of gas flow in a high pressure vehicle storage tank. The present invention adapts gas flow temperature in view of the ambient temperature environment of the storage tank and the thermal cooling of the gas that is caused by depletion of the high pressure gas from within the tank as the fuel is consumed by the vehicle engine and the tank empties. Stresses caused by the thermal conditions of the tank environment and changes associated with the depletion of the tanks are ameliorated. In the specification herein, reference to hydrogen fuel cell vehicles correlates with the use of the invention with CNG (compressed natural gas) powered vehicles and hydrogen powered internal combustion engine vehicles. Although hydrogen is typically referred to in the specification and examples, the term "hydrogen" is in most instances intended to be interchangeable with CNG and other fuel gases. Collectively the fuel gases are referred to as a "gas" or "high pressure gas". "HEX" refers to a heat exchange device.

The gas stored in pressurized tanks includes mechanical energy and thermal energy associated both with the high pressure under which the gas is refueled, stored and depleted, and the ambient environment in which the vehicle is operated. When gas flows from a storage tank through a valve system and/or a pressure regulated port, the gas cools as a result of gas expansion. When fuel gas flows from the high pressure tank, the gas loses compression and cools down the valves from inside the tank; the cooling effect of the cold gas flow may interfere with valve and regulator operation and integrity. Temperature fluctuations occur inside and outside an on board tank that, along with pressure variations occurring during tank refill and depletion, cause mechanical stress in the tank system as a result of the expansion and contraction of the physical components that comprise the tank and any in situ thermal management (heat exchanger) and/or gas flow devices (valves and regulators) that may be installed therein. Additionally, cold temperature, by itself, may induce internal or external leaks. A thermal warming system is therefore desirable both to promote gas flow and to relieve stresses induced within the tank by the effects of gas cooling during tank depletion.

OBJECT OF THE INVENTION

It is an object of the present invention to provide a thermal management system for warming the gas flow from a high pressure tank and the gas flow control system associated with a gas outlet from the tank. It is a further object to accommodate the effects of thermal cooling and mechanical stress associated with temperature decreases occurring in the tank and the flow control systems because of the ambient environment of the tank or because of temperature changes in the tank assembly resulting from depletion of gas (i.e., gas or tank part cooling caused by pressure reduction or gas expansion in the tank). It is a further object of the invention to eliminate thermally induced leaks in the gas flow fuel systems that result when temperature fluctuations are not stabilized.

SUMMARY OF THE INVENTION

The present invention provides an in situ thermal management and heating control such that temperature fluctuations, stresses caused by low temperature, and reduced gas flow are ameliorated by selective warming devices. The thermal warming system is integrated with a valve control system for regulating the flow of gas from the tank, whereby valves, seals and ports may be warmed selectively. The warming system may be thermally isolated from the gas tank itself. The system of the invention warms the fuel gas; because the gas heat mass is not small, if the gas is not warmed, a temperature difference will occur between the stored gas and the storage tank port during the course of gas flow causing the difficulties mentioned above.

The purpose of the invention is to purposefully warm the areas of the tank proximate the valve and port systems, and thereby to warm the gas itself and to moderate temperature differences to eliminate temperature variances that produce adverse effects in the entire gas flow system. The fuel gas which is exhausted from the tank may be warmed before gas flow enters the tank control valves. The invention provides devices for an internal heat management system wherein gas warming is provided for the tank depletion stage of gas usage. The invention is suitable for use with a tank having an end cap or port at both ends as well as a tank having a single center port layout. The thermal warming system may be integrated with a valve control system for regulating the flow of gas from the tank. The invention warms gas flow inside the tank during driving and reduces the risk of a fuel gas leak in cold climate driving conditions.

As a result, long term tank durability is increased because the internal temperature differences of the stored gas and the tank components are reduced and the temperature range of the vehicle operation is increased. In examples, valves, seals or a port located around the tank nut or boss are warmed up selectively. Because of the differences in heat mass between the gas per se and the metal valves, seals and port components, selective heating is more effective than warming up whole tank In a variation, the metal valves, seals and port components, are thermally isolated from the gas tank itself. In a further example, the fuel gas which exits from the tank is warmed before the gas enters the metal valve and port/boss components.

In a representative example, the heat mass of hydrogen stored in a tank is calculated as $\text{HeatMass}_{TANK} = m_{Hydrogen} \times Cp = 14.7$ kJ/K where $m_{Hydrogen}=1$ kg and $Cp_{Hydrogen}=14.7$ kj/kg/K. Heat mass of metal components of the tank port system is calculated as $\text{HeatMass}_{SUS} = m_{SUS} \times Cp = 0.5$ kJ/K where $m_{SUS}=3$ kg and $Cp_{SUS}=1.5$ kJ/kg/K. In this example, the heat mass of the hydrogen is approximately ten times that of the metal port assembly, namely 14.7 kJ/K÷1.5 kJ/kg/K Thus, in the invention, temperature variances are moderated by selective warming. An efficient warming system for gas flow is provided wherein valves, seals and ports are warmed selectively. The fuel gas exhausted from the tank may be warmed before or while gas flow enters the tank control valves. With a warming device of the invention installed at a control point for gas flow thermal stress is reduced and greater efficiency and lower cost is achieved when compared with systems that heat in bulk the entire quantity of gas stored in the tank interior for the same purpose.

The invention is described more fully in the following description of the preferred embodiment considered in view of the drawings in which:

DETAILED DESCRIPTION OF THE INVENTION

The invention provides a selective warming system for the thermal management of gas flow from a high pressure vehicle tank. A heat source is disposed proximate to and aligned concentrically with a gas flow control system of the vehicle tank (typically at the tank boss) wherein, depending upon the operating condition of the vehicle or the ambient environment in which the vehicle is operated, the metal heat mass of the gas flow system may be warmed. Preferably, the heat source is disposed in direct contact with the gas flow control system or may be interconnected thereto by a heat pipe. In one embodiment, a heat isolation device surrounds an internal HEX, or the internally installed flow control system at a tank boss. The system of the invention warms the gas flow control system of the tank to a temperature corresponding to at least the minimum lower limit temperature permitted by the temperature tolerance range of the gas flow control system and the tank itself. In the invention, a selectively operating heat isolation device, or a heat source, is disposed proximate to and aligned concentrically with a system in the vehicle tank, such as a tank boss including system control devices, or an internal HEX installed within the tank. A heat source warms the gas in the tank to a temperature corresponding to at least the minimum lower limit temperature permitted by the temperature tolerance range of the gas flow systems of the tank and the tank itself. The invention provides a selective warming thermal management system for gas flow from a high pressure vehicle tank comprising a heater disposed proximate to and aligned concentrically with the gas outlet flow control system of the vehicle tank, the heat source corresponding in an inner diameter with the outer diameter of the gas outlet flow control system of the tank wherein heat emanating from the heat source warms the gas outlet flow control system of the tank to a temperature corresponding to at least the minimum lower limit temperature permitted by the temperature tolerance range of the gas outlet flow control system of the tank.

The heater may be installed within the interior of the tank or exterior to the tank. In most instances, the heater is preferably operative during the time period in which the vehicle is in a driving mode. In a particular embodiment, the heater is operative during the time period in which a vehicle in which the tank is installed is exposed to an ambient environmental temperature that would otherwise cause the temperature of the flow control system of the tank to exceed the lower limit temperature permitted by the temperature tolerance range of the gas outlet flow control system of the tank. In various configurations, the heater is thermally interconnected with a vehicle radiator system that includes a circulating fluid for capturing exhaust heat or the heater may be warmed by a heat source that comprises at least one of exhaust heat from the power plant, fuel cell, battery, motor, radiator, air conditioner or other vehicle system; heat from the vehicle frame or sub frame; or heat generated in an electrical, chemical or heat exchanger heater.

The vehicle storage tank will typically include an internal in situ thermal management heat exchanger and the heater will envelop at least a portion of the end section of the heat exchanger and the internal section of the gas outlet flow control system of the tank. Thermal energy to warm the heater may be optionally conveyed to the heater through fluid flow of a heat transfer media from a heat exchanger interconnected with a vehicle heat producing system or by a heat pipe interconnected with a vehicle heat producing system. Selective heating may also include selective thermal isolation of gas flow from the tank utilizing an insulating shroud disposed proximate to and aligned concentrically with the gas outlet flow control system of the vehicle tank at the end of the tank from which gas flows. The insulating shroud has an inner diameter greater than the outer diameter of the gas outlet flow control system of the tank such that gas flowing through the gas outlet flow control system of the tank passes through an open end section of the shroud, opposite the end section of the shroud adjacent the tank boss, The gas within the shroud is insulated from the cooling effects of gas expansion caused by gas depletion from the tank such that the tank components do not drop in temperature below the minimum lower limit temperature permitted by the temperature tolerance range of the tank component assemblies. In another example, a selective warming thermal management system for gas flow from a high pressure vehicle tank comprises both a heater disposed proximate to and aligned concentrically with the gas outlet flow control system of the vehicle tank and an insulating shroud disposed proximate to and aligned concentrically with the gas outlet flow control system of the vehicle tank at the end of the tank from which gas flows. A thermostat may be used in conjunction with a control system to regulate tank component temperature and heat input to prevent temperature from dropping below a predetermined tolerance value.

The heat source may be installed either within the interior of the tank or exterior to the tank. In modes of vehicle operation, the heat source warms the gas outlet devices during the time period in which a vehicle in which the tank is installed is either driven or parked. Warming the gas outlet may also be effective during the time period in which a vehicle in which the tank is installed is exposed to an ambient environmental temperature that would otherwise cause the temperature of the flow control system of the tank to exceed the lower limit temperature permitted by the temperature tolerance range of the gas flow control system or the tank. A heat isolation shroud installed at an end section of an internal HEX will prevent the cooling effects of exiting gas from adversely affecting the gas flow control valves proximate the end section at the one end of the tank.

In examples, a heat source is thermally interconnected with a vehicle radiator system that includes a circulating fluid for capturing exhaust heat. When the vehicle storage tank includes an internal in situ thermal management heat exchanger, the heat source may envelop at least a portion of the end section of the heat exchanger and the internal section of the gas outlet flow control system of the tank.

Thus, the invention provides a selective heating system for warming the gas outlet flow control system of a vehicle gas storage tank. Heat sources utilizable with the invention include exhaust heat from the power plant, fuel cell, battery, motor, radiator, air conditioner or other vehicle system; heat from the vehicle frame or sub frame; or heat generated in an electrical or chemical media or heat passed through a heat exchanger or conducted by a heat pipe. The thermal energy to warm the heat source may be optionally conveyed to the heat source through a heat exchanger interconnected with a vehicle heat producing system.

In brief, the invention provides internal gas warming methods with selective heat isolation management for high pressure gas storage cylinders on high pressure gas fueled vehicles, including vehicles powered by compressed natural gas, CNG, and hydrogen including fuel cell and internal combustion engines powered by a high pressure fuel gas. In many examples, fuel cell and CNG powered vehicles include gas fuel tanks that include gas absorbing materials in the interior of the tank. During driving, the gas within the tanks becomes cold, caused by a decrease in the tank pressure. When a vehicle tank includes gas absorbing materials, the gas absorbing materials absorb heat during the gas discharge from the tank. Environmentally, a typical ambient design temperature for vehicle components is approximately 20° C. In cold climates, the internal gas temperature in a vehicle tank can drop to −60° C., a temperature that may be below the permissible operating temperature range of O-ring and/or other rubber or polymer seals used in the tank and the port inlet and outlet metal part assemblies that control the inflow and outflow of gas to and from the storage tank. Physical stresses in the system may be caused by expansion and contraction of tank system elements caused by temperature variances. When temperature variances are below the acceptable range allowable for tanks, seals, valves, control devices, and the like, thermally caused mechanical variations in the tank and associated gas flow assemblies may result in leakage of the stored gas.

The invention provides a solution that can efficiently control the gas temperature and stabilize temperature differences in gas flow controls during driving and parking; the risk of a fuel gas leak in cold climate driving conditions is consequently reduced. The invention may increase the tank durability because the internal temperature difference between the stored gas and the tank's control elements (and outlet) is lessened. Thus, the temperature range of the vehicle operation is extended.

In examples, valves, seals or a port are selectively warmed or isolated from thermal variations. The internal HEX, valves, seals or a port are thermally isolated from the gas tank itself, and the fuel gas which exits from the tank may also be warmed up before the valves. As explained above, the thermal warming system may be integrated with a valve control system for regulating the flow of gas from the tank. In an example discussed in the Summary of the Invention section of this application, the heat mass of hydrogen in a tank is calculated as approximately ten times that of the metal port assembly of the tank in which the gas is stored. In the invention, an efficient warming system for gas flow is provided wherein valves, seals and ports are warmed selectively; the warming system may be thermally isolated from the gas tank itself; and the fuel gas which is exhausted from the tank may be warmed either before gas flow enters the tank control valves, or while gas flows through the valves, or both. By installing a selective warming device at a control point for gas flow from the tank, or using a heat isolation shroud, greater efficiency and reduced cost is achieved when compared with systems that heat in bulk the entire quantity of gas stored in the tank interior to achieve similar results.

Figure 1A:
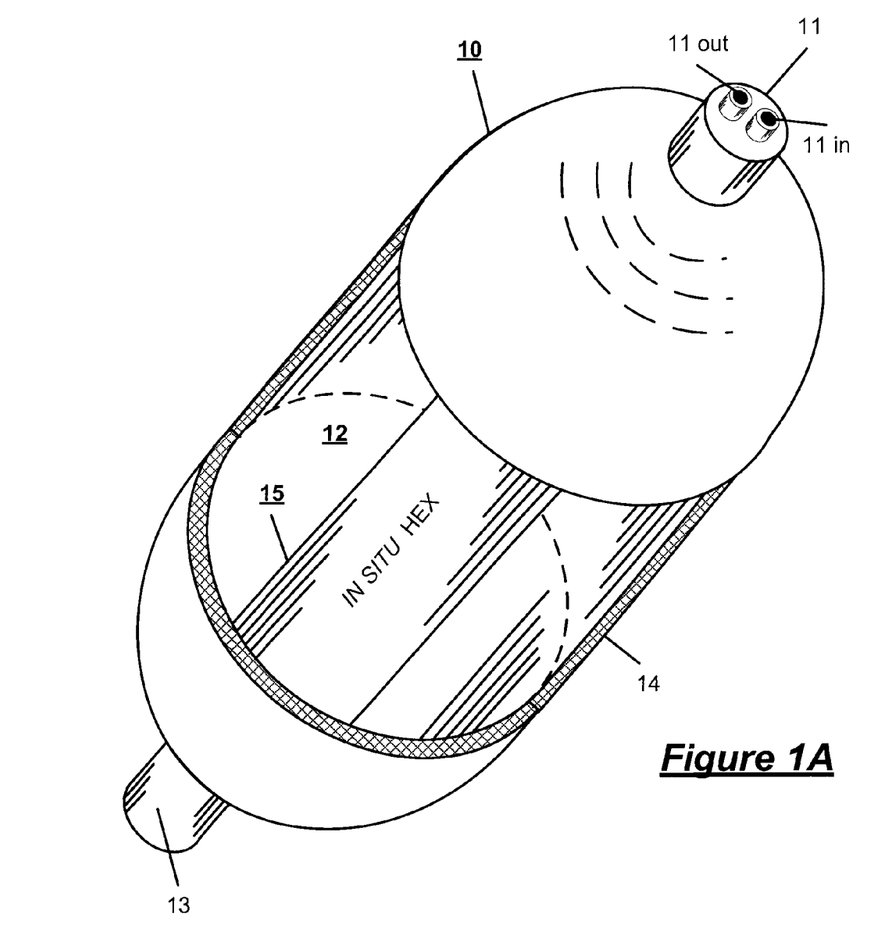
FIG. 1A is a cut away view of a typical high pressure gas storage tank including a boss at each end and an in situ thermal management device [Heat Exchanger ("HEX")] internally installed along the longitudinal axis of the tank.
Figure 1B:
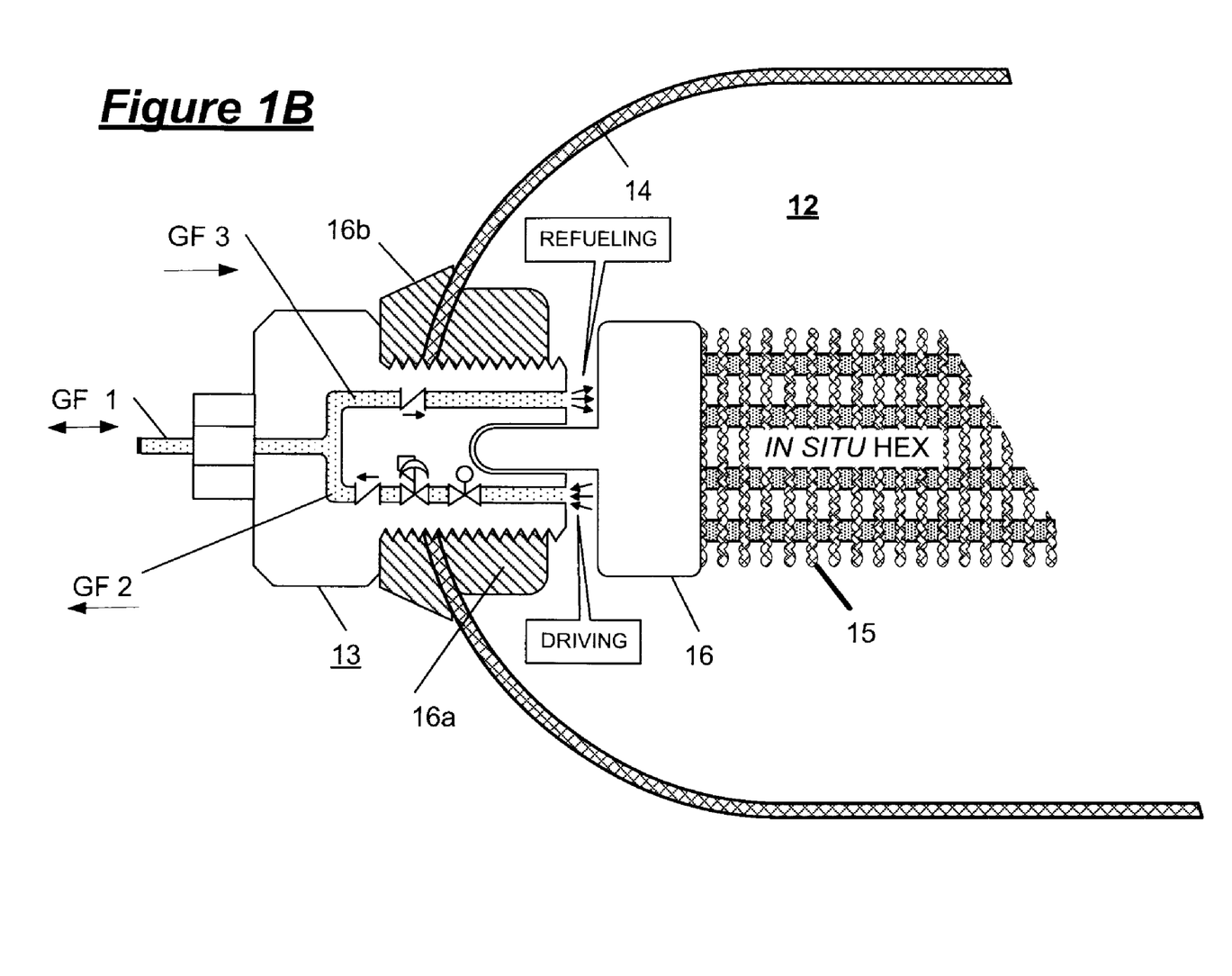
FIG. 1B depicts a cross section detail at one end of a tank showing an arrangement of gas valves, inlet, outlet, and flow control devices within the tank boss wherein the boss interconnects with the plug structure of an in situ HEX device.

With reference to FIG. 1A, a typical cylindrical high pressure gas storage tank 10 having an interior volume 12 for the storage of gas is shown with external sidewall 14, including first end boss 11 and second end boss 13 (optional) at the opposite ends of the tank and an in situ HEX, 15 internally installed within the tank. Inlet and outlet for gas flow into and from the tank are shown at boss 11 at 11 in and 11 out. FIG. 1B shows the elements of a boss 13 at one end of the tank. External gas flow inlet/outlet conduit GF 1 connects with gas flow outlet conduit GF 2 and gas flow inlet conduit GF 3 in the boss assembly which also includes the gas flow control mechanisms such as check valves in the inlet and outlet conduits and a pressure regulator and control valve in the outlet conduit (See FIG. 3A). In the example shown in FIG. 1B, the boss assembly 13 includes conjoined threaded interior and external elements 16a and 16b. Ordinarily, the cold fuel gas exiting through flow conduit GF 2 during driving directly cools down the valve assembly in boss 13 and elements 16a and 16b from the inside of the tank. The internal HEX 15 is installed as a plug in (the plug is identified as 16) at the tank end boss 13. Elements 13, 16a and 16b together may also be referred to as the nut assembly. The HEX plug is 16.

Figure 1C:
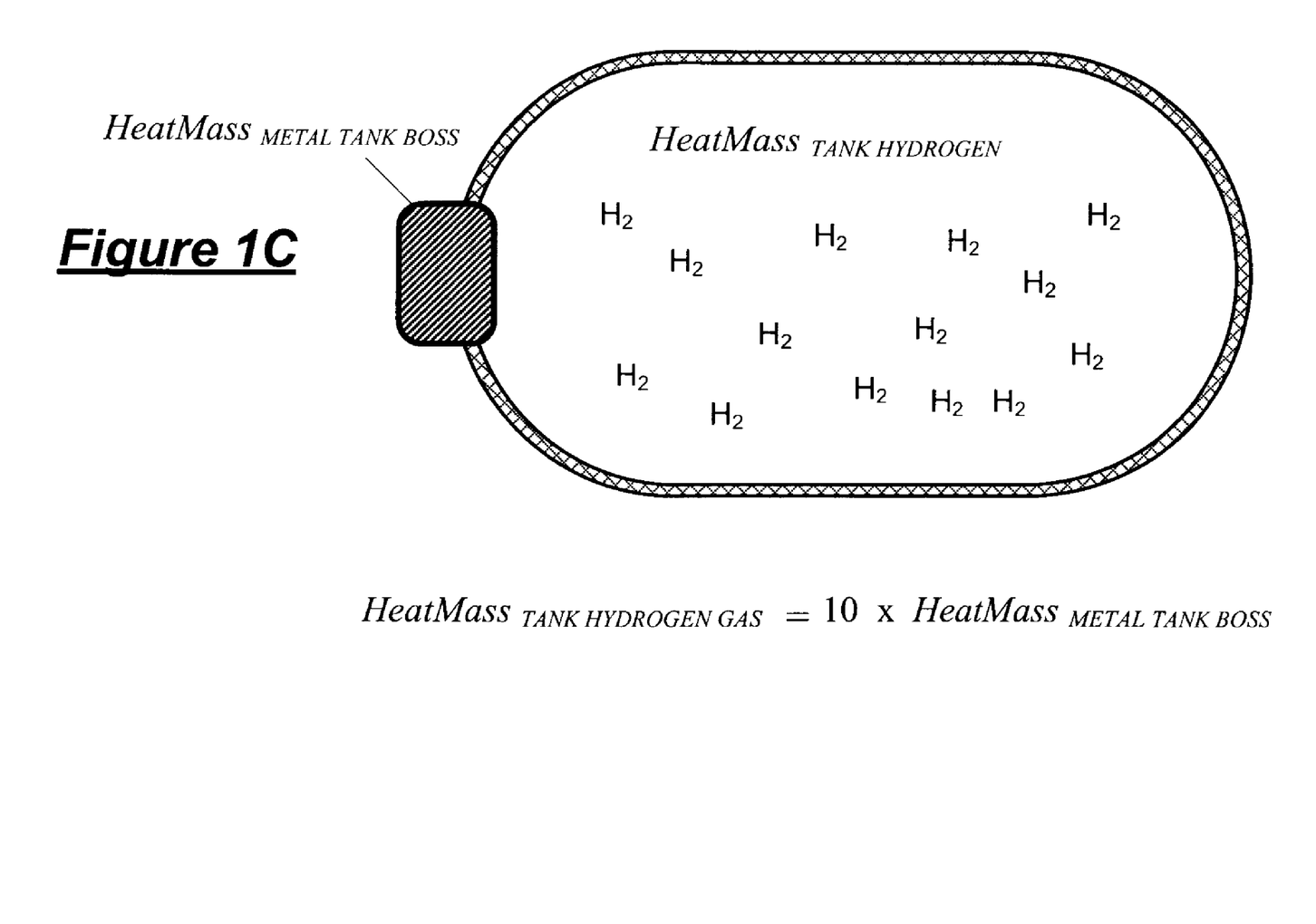
FIG. 1C shows heat mass relationships between (1) the tank and the stored gas therein and (2) a metal boss element at the outlet of the tank.

FIG. 1C shows the heat mass relationships between the tank and the gas stored therein and the metal boss element.

Figure 2A:
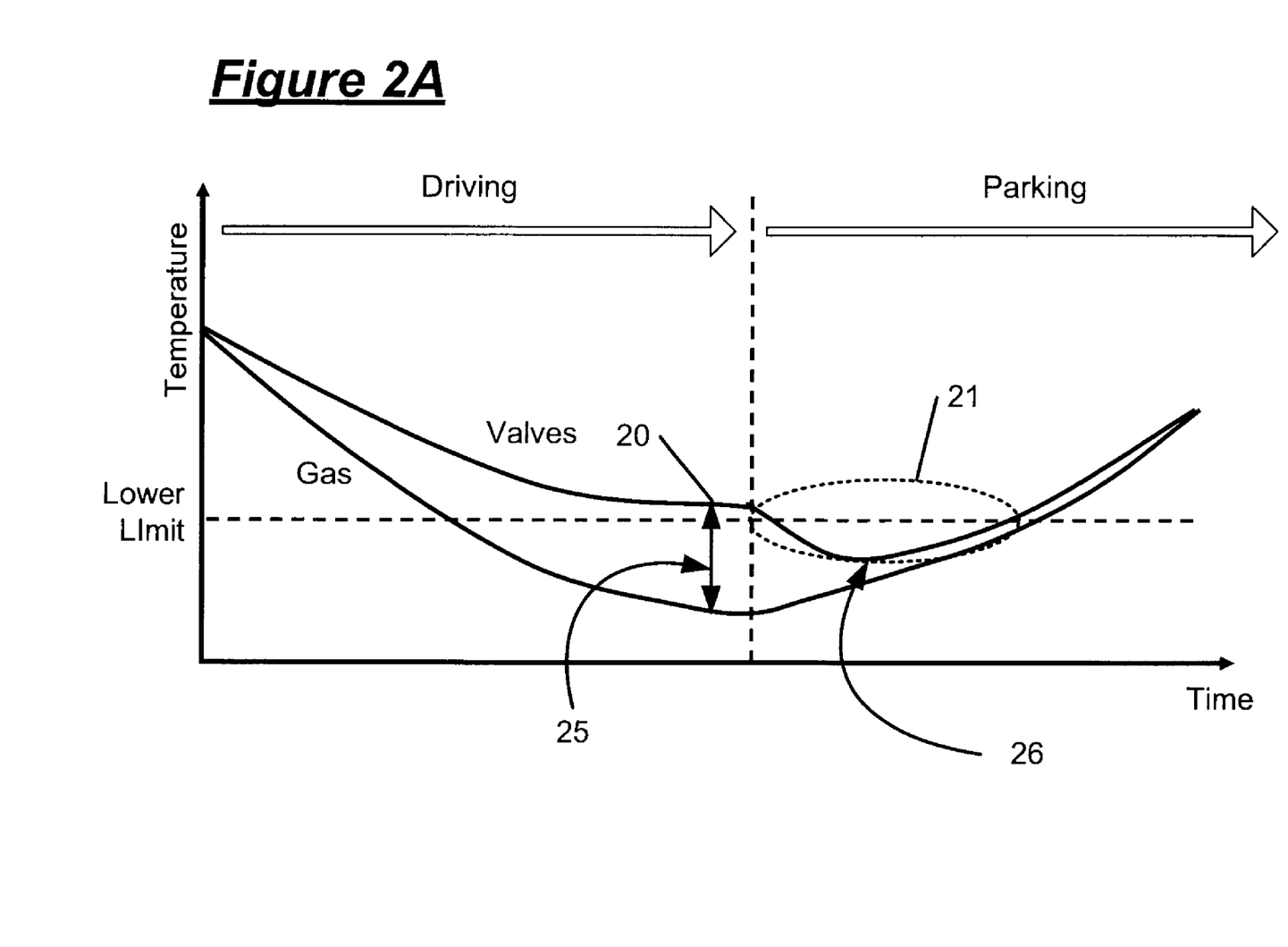
FIG. 2A is a chart of temperature plotted against a time axis depicting relative temperatures of the gas within the tank and the metal boss elements during the vehicle conditions of driving and parking (in the absence of the invention).
Figure 2B:
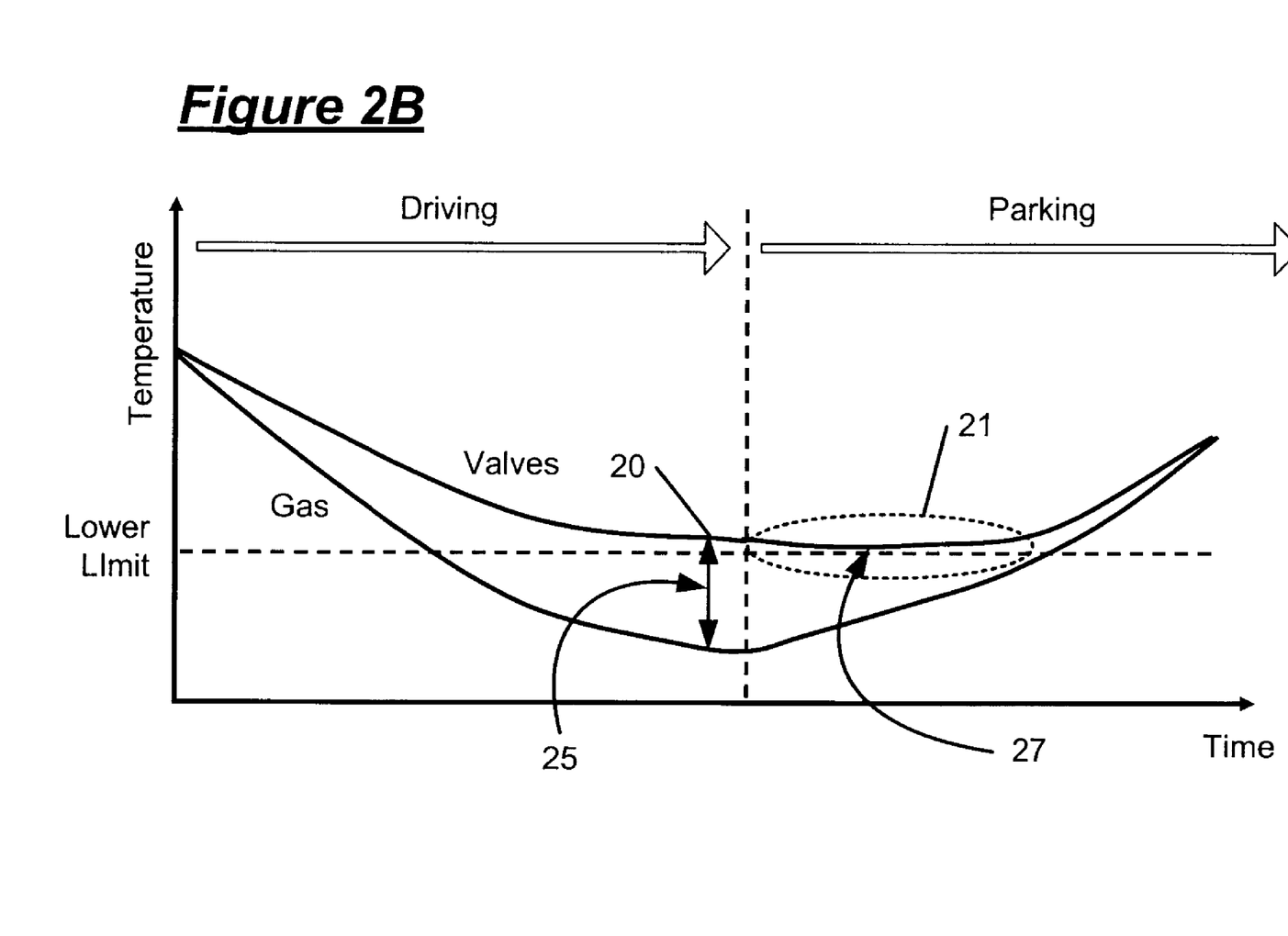
FIG. 2B is a chart of temperature plotted against a time axis depicting relative temperatures of the gas within the tank and the metal boss elements during the vehicle conditions of driving and parking in a tank system utilizing the selective warming device of the invention.

Driving and parking temperature conditions in the vehicle tank system, without and with the invention, are charted respectively in FIG. 2A and FIG. 2B. In a typical parking condition, FIG. 2A illustrates that as the tank temperature cools with time, the temperature 20 of the valve system follows such that, in the period shortly after parking 21, the valve temperature cools below the lower acceptable limit of temperature tolerance for the valves. Maintenance of the temperature of the valve assembly is accomplished during driving by warming the gas such that the temperature differential shown by 25 is maintained. Without warming after parking, the valve assembly is cooled to below the lower temperature limit 26 by the $H_2$ heat mass of the gas flowing from the tank. When the selective warming heat isolation system of the invention is used, the temperature chart of FIG. 2B illustrates the effect of selective heating wherein the metal boss elements maintain an acceptable temperature above the lower limit. Maintenance of the temperature of the valve assembly is accomplished during driving by gas warming 25. In the invention utilizing selective heat isolation (insulation), after parking, the temperature of the valve assembly is maintained at temperature 27, above the lower temperature limit of the system.

Figure 3A:
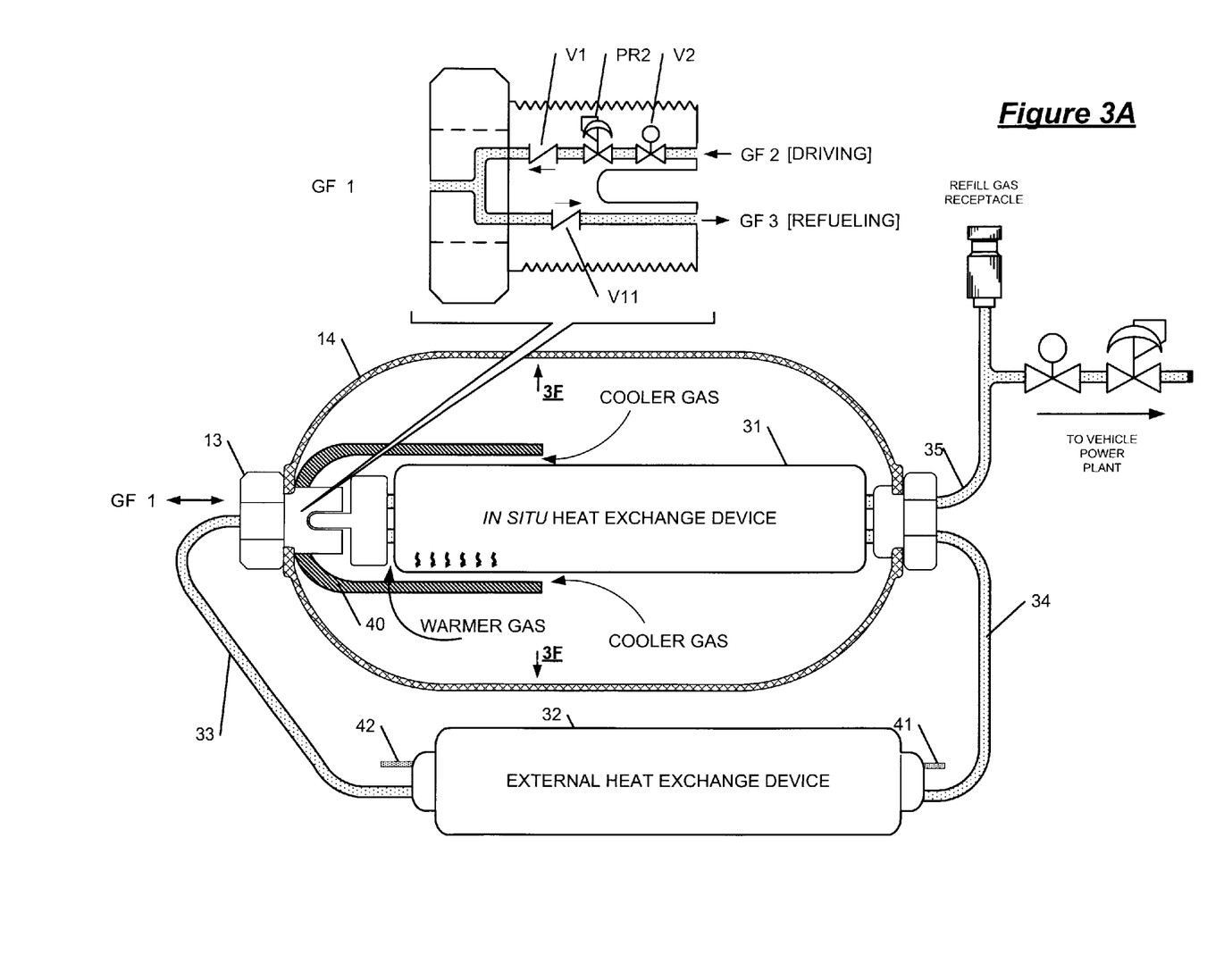
FIG. 3A depicts, in a cross section detail, an example of a tank system, including internal and external heat exchange devices and boss assemblies at either end of the tank, with a heat isolation device of the invention installed within the tank shrouding the one end of the internal HEX that includes flow control valves and regulators.

In a cross section detail of a tank system, FIG. 3A depicts a complete tank system and component parts: tank 14; boss 13; and boss elements comprising the gas flow regulation conduits: 1) external inlet/outlet conduit GF 1; 2) internal outlet conduit GF 2 with check valve V1, pressure regulator PR2 and control valve V2; and 3) internal inlet conduit GF 3 with check valve V11 leading from and to the tank interior. The plug in internal tank HEX is identified as 31. An external heat exchanger 32 for gas flow is interconnected with the tank interior through conduit 33. The opposite end of internal HEX 32 is interconnected by conduit 34 with internal HEX 31 through which gas flows and exits through conduit 35 (in the driving mode) for introduction to the power plant. [When the tank is refilled gas flows from the station receptacle through conduit 35 to internal HEX 31, from internal HEX 31 through conduit 34 through external HEX 32, through conduit 33, into GF 1, and ultimately into the tank through check valve V11 and tank inlet GF 3.]

Figure 3B:
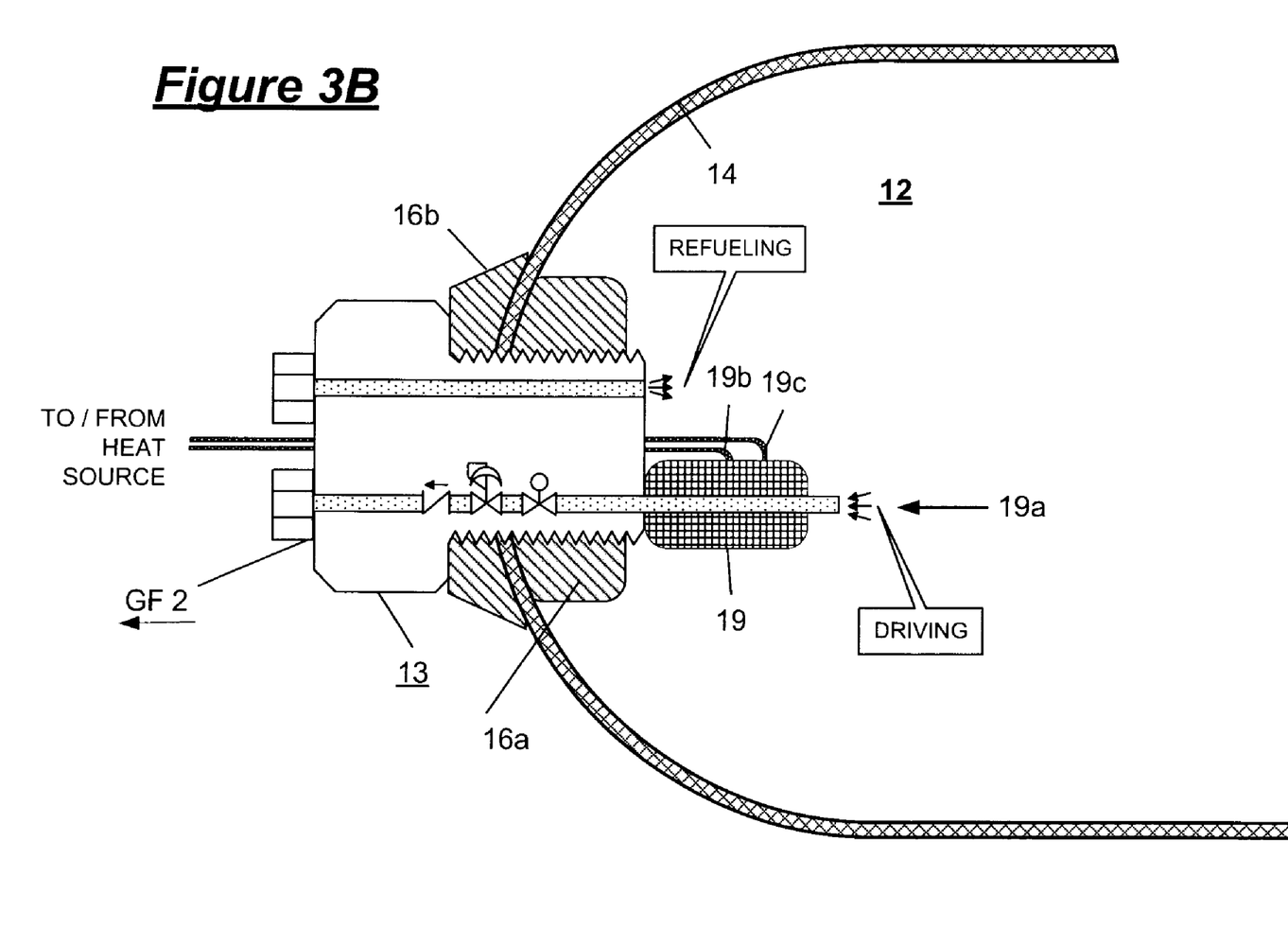
FIG. 3B illustrates a heater or heat exchanger provided within the tank, circumferentially around the gas flow outlet conduit of the tank that provides fuel to the vehicle power plant.

A heat isolation device of the invention 40 is shown in FIG. 3A installed internally within the tank at the tank end that includes the metal boss 13, the boss control valve assembly, and the plug in for the in situ HEX 31. Heat isolation device 40 surrounds the boss assembly at the tank interior and extends as a shroud over the bass and the end section of internal HEX 31 facing the boss 13. In the driving mode, when gas is being depleted from the tank, heat isolation device 40 insulates gas flowing into conduit GF 2 from adverse cooling effects of gas expansion caused by the gas flow from the tank and the lower pressure resulting in the gas. The in situ HEX is warmed by interconnection 33 and 34 with external HEX in turn connected to a vehicle heat source by conduits 41 and 42. An embodiment is shown in FIG. 3B wherein the cold fuel gas flowing through conduit GF 2 and the boss/valve assembly, is warmed before the valves. The temperature of the valves will increase and the temperature is maintained above the lower tolerance limit. As shown in FIG. 3B, a heater or heat exchanger 19 is provided circumferentially around the conduit GF 2 between the gas entry point 19a from the tank interior 12 and the boss and valve assembly, 13, 16a and 16b. Heater 19 is interconnected with a vehicle heat source through interconnecting conduits 19b and 19c.

Figure 3C:
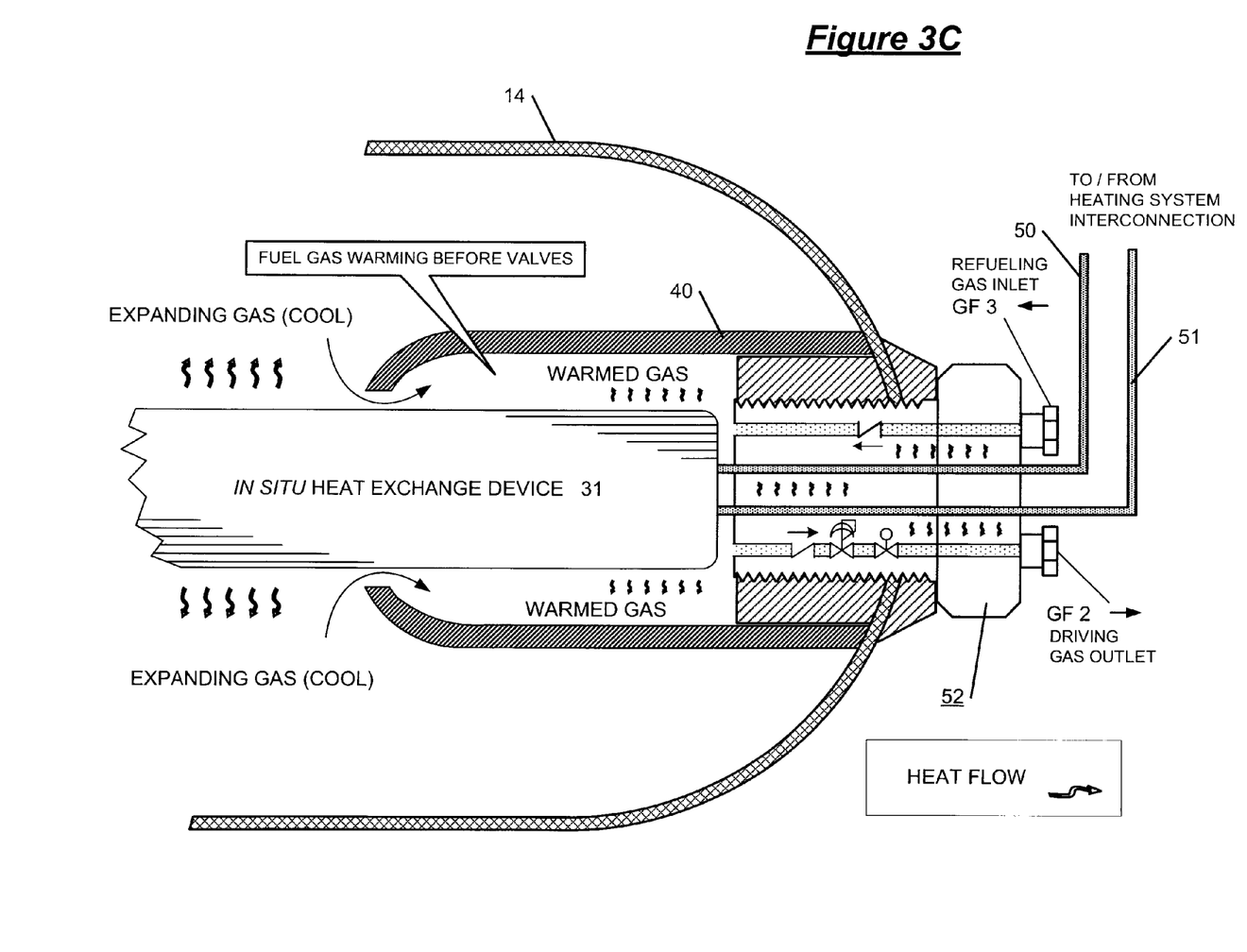
FIG. 3C shows, in a cross section detail of one end of the tank, a warming/isolation device of the invention installed in the tank interior at a boss and the heat flow in the tank associated with the warming device.

FIG. 3C is a side longitudinal cross section of the flow control end of the tank 14. Heat isolation device 40 insulates gas flow from adverse effects of cooling caused by tank decompression as gas is depleted from the tank in the vehicle driving mode. In FIG. 3C, heat flow in the system indicated by the arrows ⌢. Fluid conduits 50 and 51 convey a warming fluid for heat exchange from a vehicle heat source, such as the vehicle cooling system. The warming fluid circulates in a closed circuit from the heat source through internal HEX 31 which radiates heat to the gas stored within the tank interior. As the warming fluid passes through the metal boss 52, the boss itself is warmed by the fluid flow. As gas exits the tank, the gas is warmed by heat exchange within the boss and with HEX 31. Cooler gas enters the volume enclosed by heat isolation shroud 40. The insulating shroud maintains a warmer temperature in the gas enclosed therein in the volume insulated by the shroud, thus the fuel gas flowing to the vehicle is warmed before the gas flows the valves in the boss assembly 52.

Figure 3D:
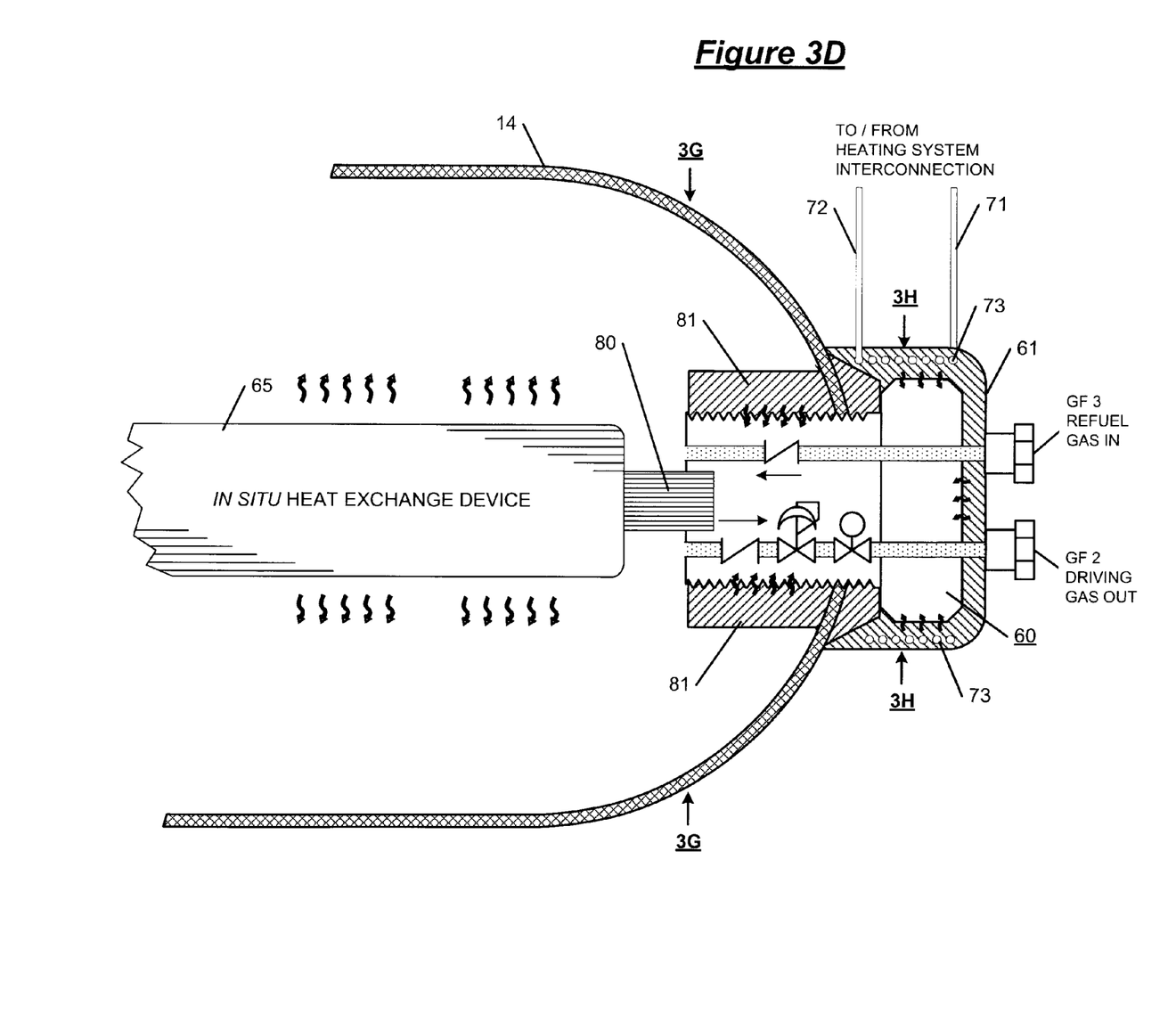
FIG. 3D shows, in a side cross section detail of one end of the tank, a warming device of the invention installed externally surrounding the boss at an end of the tank. Heat from the external warming device is conducted through the metal boss elements and conveyed to the internal HEX by a heat pipe.

FIG. 3D shows, in a cross section, a control boss and valve system 60 at the end section of the tank 14 circumferentially surrounded by a warming element 61 enveloping the exterior section of the boss. Warming element 61 is heated by an electrical or fluid flow coil 73 concentric with the boss. Power terminals for electrical, or fluid, if applicable, connection of the coil are at 71 and 72. If the coil were a tubular coil for a heat exchange fluid flow, a fluid inlet and a fluid outlet would correspond to the terminal ends of the coil 71 and 72. The warming element is in turn warmed by a vehicle heat source with a circulating heat exchange fluid, by an electrical warming element, or equivalent heat source. In the embodiment of FIG. 3D, a heat pipe 80 extends from the warmed boss 60 to an internal HEX 65 through which heat is conveyed to the fuel gas being depleted from the tank. Component 81 interconnects by threads with screw in boss 61. Heat flow in the FIG. 3C system is indicated by the arrows ⌢.

Figure 3E:
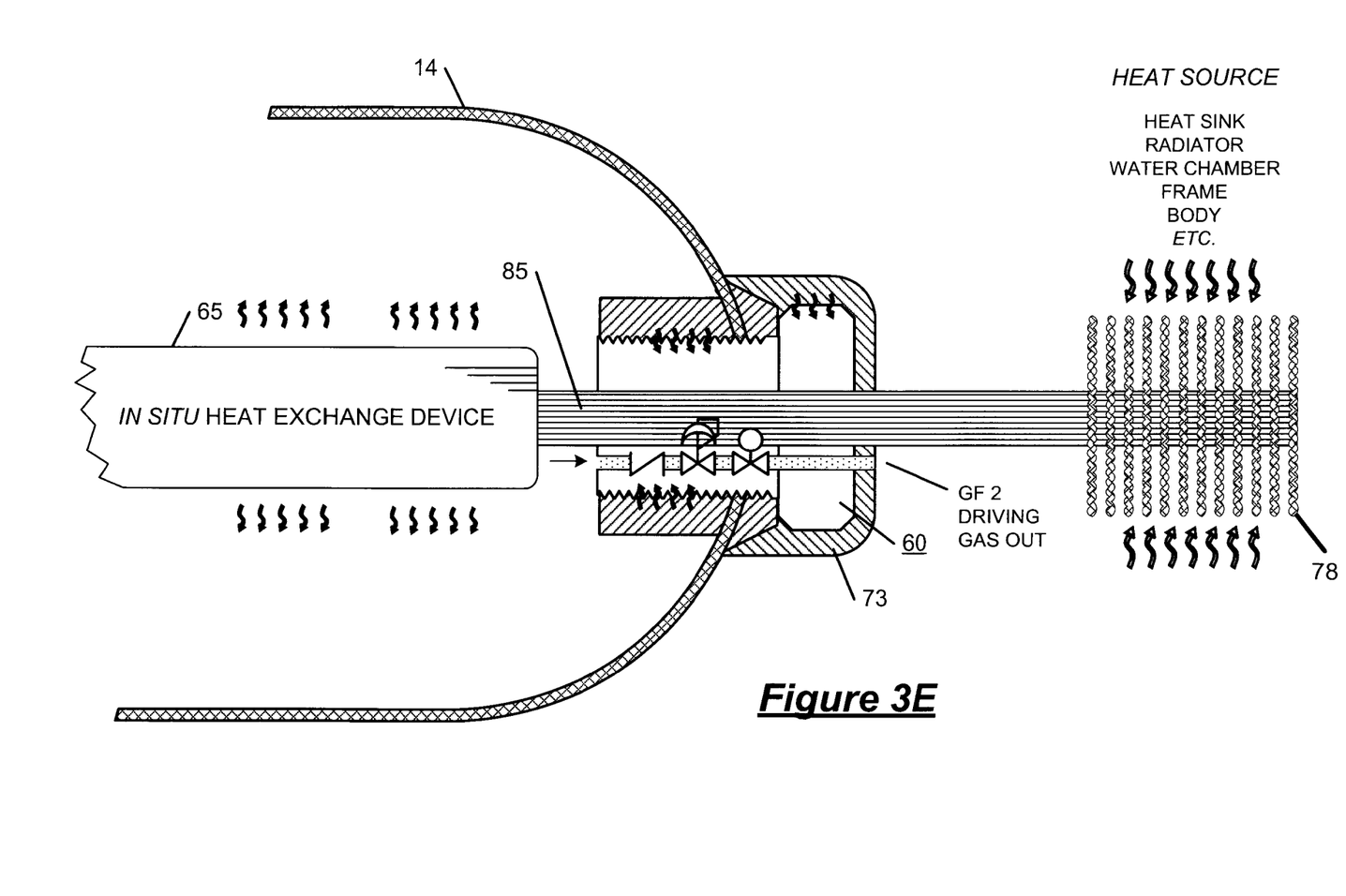
FIG. 3E shows a side cross section detail of one end of the fuel tank wherein a heat pipe interconnects an in situ HEX with an external heat source.
Figure 3F:
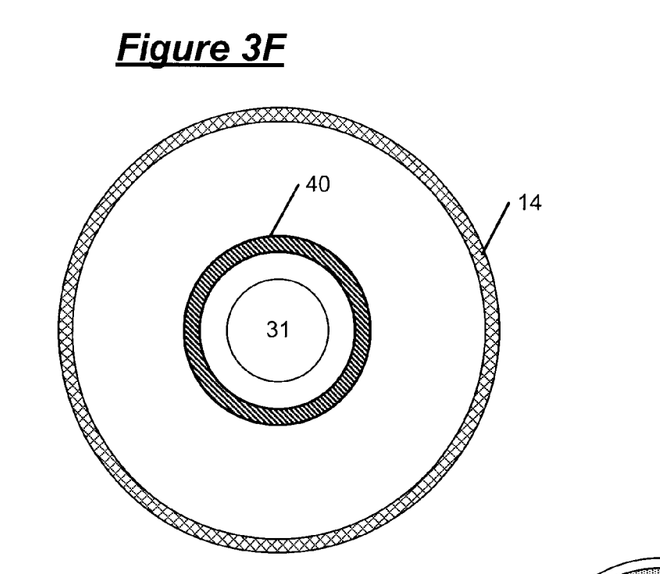
FIG. 3F is a transverse cross section of the system of FIG. 3A at the section indicated by 3F→ ←3F.
Figure 3G:
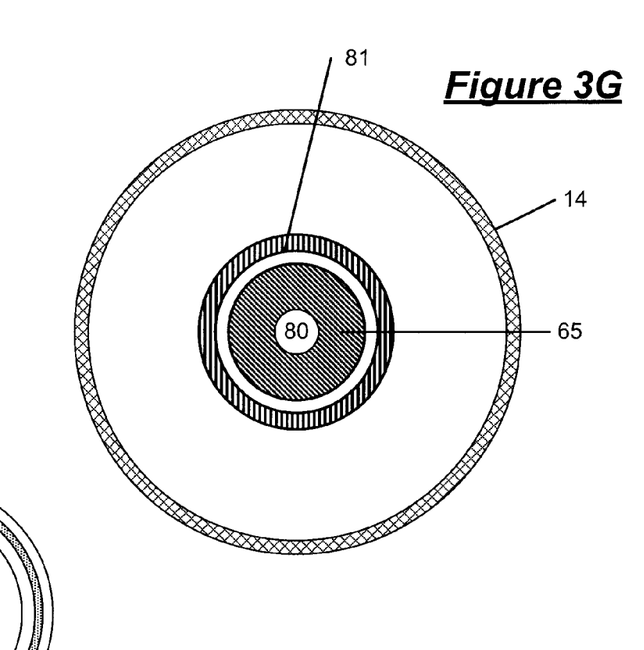
FIG. 3G is a transverse cross section of the system of FIG. 3D at the section indicated by 3G→ ←3G.
Figure 3H:
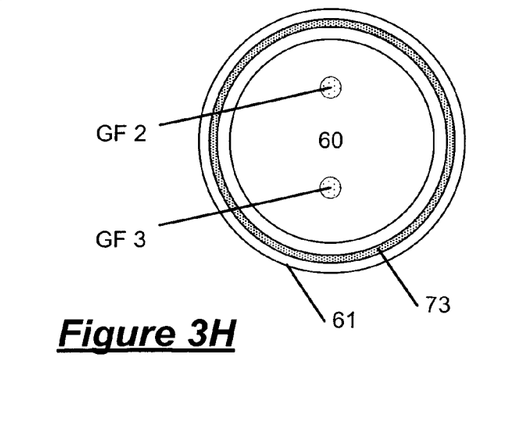
FIG. 3H is a transverse cross section of the system of FIG. 3D at the section indicated by 3H→ ←3H.

Thus, as explained above, a selective warming and heat isolation system is provided based upon the heat mass absorption differential between the gas within the tank and the metal component boss through which the gas flows. The insulating shroud is formed from a known material appropriate for insulating a low temperature, high pressure tank and may be employed separately, or in combination with a thermal warming component. For example, as shown in FIG. 3C, as gas is withdrawn from the tank, the gas expands, the gas in the tank cools; the cooler gas flows within the cavity provided by the shroud where the flowing gas is warmed by in situ HEX 31 and flow through warmed metal boss 52 interconnected to a heat source through conduits 50 and 51. Thus, the shroud encloses hotter gas and insulates the warmer gas from being comingled with the entire volume of the tank. By reason of the selective warming, it is not necessary to heat the entire volume of gas within the tank, thereby resulting in an energy efficient warming system for gas flow during the driving condition of the vehicle. In FIG. 3D, a heat pipe, 80 is shown interconnecting an internal HEX 65 with a heated shroud 61 surrounding exterior boss 60 which is threaded into matching tank end element 81. The heated shroud 61 is connected to a vehicle heat source such as the electric system, a radiator, water chamber or other source of vehicular heat, for example, the vehicle frame or body. In FIG. 3E, a heat pipe 85 interconnects HEX 65 through a shroud insulated 73 exterior boss 60 with a vehicle heat source as with the device shown in FIG. 3D.

Figure 4A:
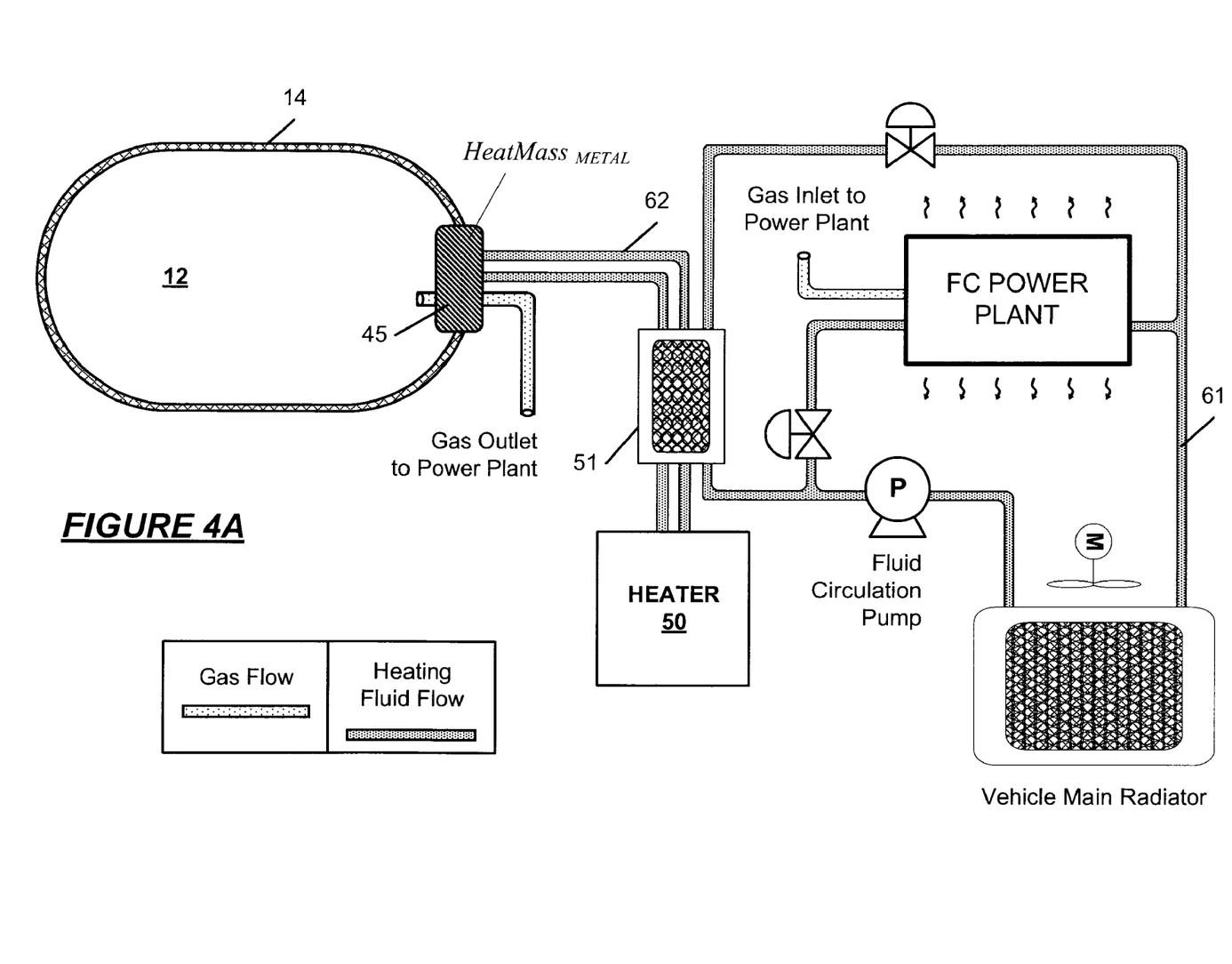
FIG. 4A is a schematic diagram showing the metal heat mass warming device of the invention interconnected with possible heat sources in the vehicle for use with the invention.
Figure 4B:
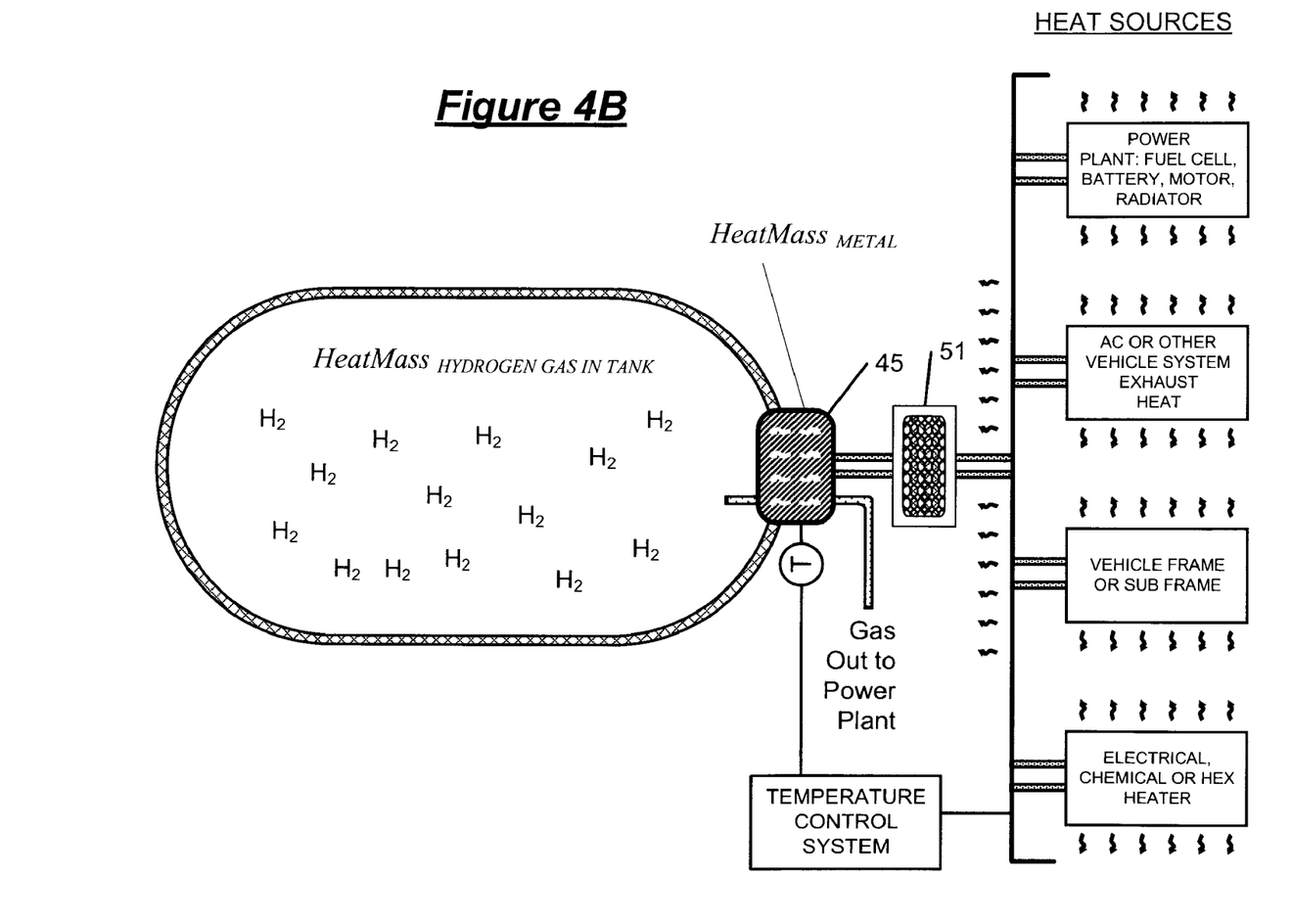
FIG. 4B is a chart showing the possible heat sources in the vehicle with which the selective warming device of the invention for metal heat masses within the system may be interconnected either directly or through an intermediate heat exchanger.

FIG. 4A is a schematic diagram showing the metal heat mass warming device of the invention 45, whether installed internally or externally, interconnected with heat sources in the vehicle such as the vehicle power plant cooling system, or a separate heating unit 50. The coolant fluid circulation system conduits are indicated at 61 and 62. The selective warming device 45 may be interconnected directly with a heat source, or connected through an intermediate, optional, heat exchanger 51. FIG. 4B is a chart showing the possible heat sources in the vehicle with which the metal heat mass warming device of the invention may be interconnected either directly or through an intermediate heat exchanger. In FIG. 4B, the disclosed embodiment employs a thermostat control T regulating heat transfer to the boss tank assembly with a temperature control system that monitors metal element temperatures and heat flow based upon the acceptable lower tolerance limit of the tank components. Thus, where the valves, seals or a port, located around the tank boss and nut assembly are warmed selectively, a system is provided that is more effective than warming up the whole tank because of the comparative small heat mass of the metal parts in view of the heat mass of the tank and gas therein as a whole. When cold fuel gas is directly warmed up at the control valve site, the temperature of valves increases and will be maintained above the tolerance limit. Heat sources include exhausted heat from the air conditioner, motor, battery or power plant. A heat pipe may conduct heat from a vehicle heat sink such as the radiator, water chamber, vehicle frame or body components. A liquid or gas fluid heat transfer system to the selective warming device may also be employed. Other heat sources include an electrical heater and a chemical or physical reaction resulting from a refueling gas burning and/or a metal hydrate material media.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A management system for controlling a temperature of a gas flow control system in an on board high pressure vehicle gas storage tank having an interior volume in which fuel gas is stored, comprising, a tank having opposite ends in at least one of which a metal tank boss housing the gas flow control system is installed, the gas flow control system comprising an inlet through which fuel gas flows into the tank and an outlet though which fuel gas flows out of the tank, the gas flow control system being sensitive to a low temperature that will affect the operability of the system;

a heat exchanger within the interior volume of the tank thermally interconnected with an on board heat source, the heat exchanger being interconnected with the metal tank boss such that heat transferred to the heat exchanger from the on board heat source is conveyed to the metal tank boss;

a heat exchanger external to the tank, the external heat exchanger being thermally interconnected to the heat exchanger within the interior volume of the tank via a second boss having a second gas flow conduit, the second boss being disposed at an end of the tank opposite the end housing the metal tank boss; and     a thermostat regulating the flow of heat to the heater such that the thermostat regulates the temperature of the gas flow control system to a temperature corresponding to at least a minimum lower temperature limit.

2. The system of claim 1 further including an insulating shroud disposed proximate to and aligned concentrically with the metal tank boss, the insulating shroud having an inner diameter greater than the heat exchanger within the interior volume of the tank and extending from an interior end of the metal tank boss to partially enclose the heat exchanger within the interior volume of the tank, wherein cooling gas flowing from the tank through the gas flow control system passes through an inner volume of the shroud where the temperature of the gas exiting the tank is regulated such that the temperature of the gas outlet flow control system corresponds to at least the minimum lower limit temperature permitted by the temperature tolerance range of the gas flow control system.

* * * * *